Figure 1:
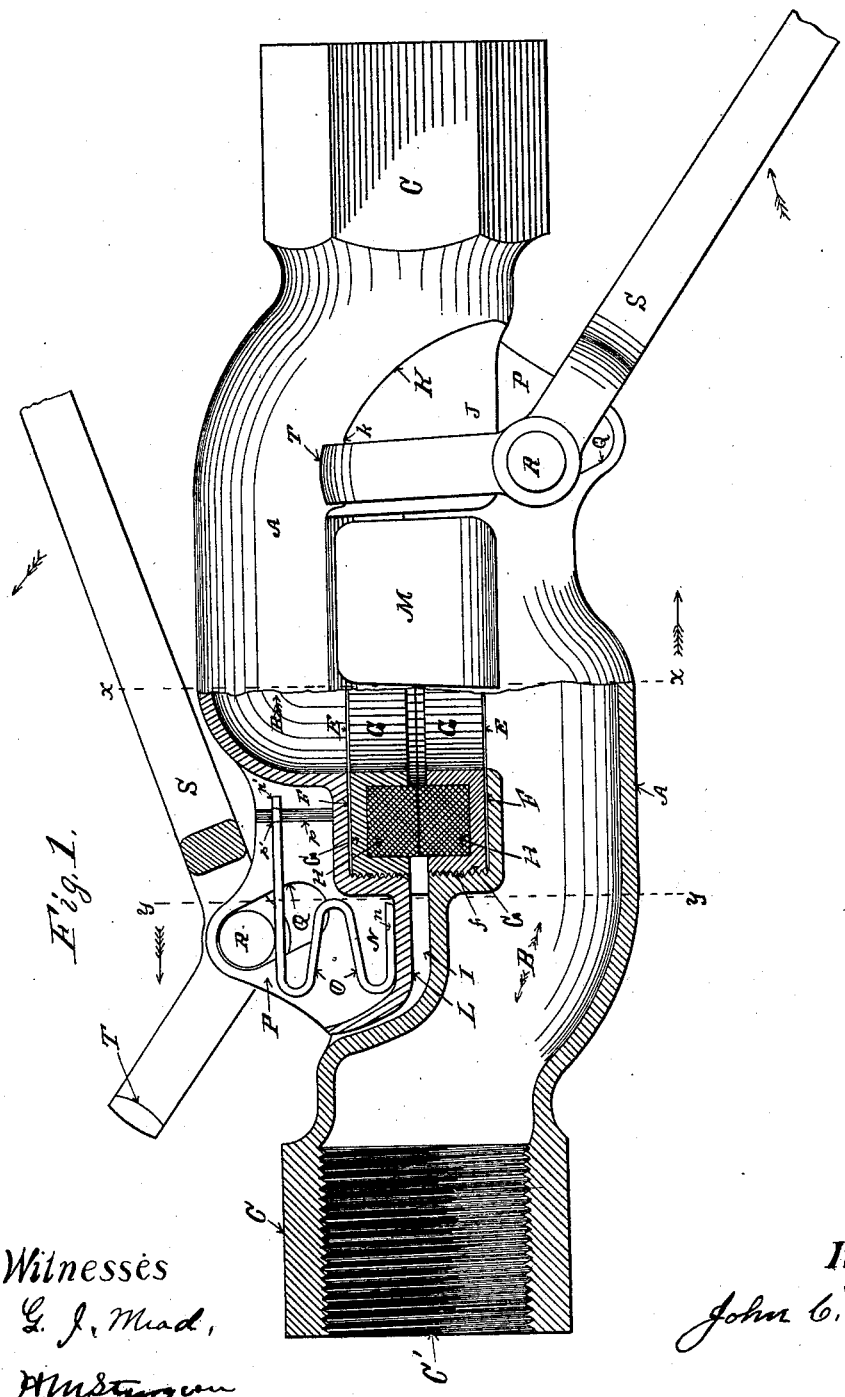

(No Model.) 2 Sheets—Sheet 1.

J. C. STURGEON.
PIPE COUPLING.

No. 409,121. Patented Aug. 13, 1889.

Witnesses
G. J. Mead,
H. M. Sturgeon

Inventor
John C. Sturgeon (No Model.) 2 Sheets—Sheet 2.
J. C. STURGEON.
PIPE COUPLING.
No. 409,121. Patented Aug. 13, 1889.
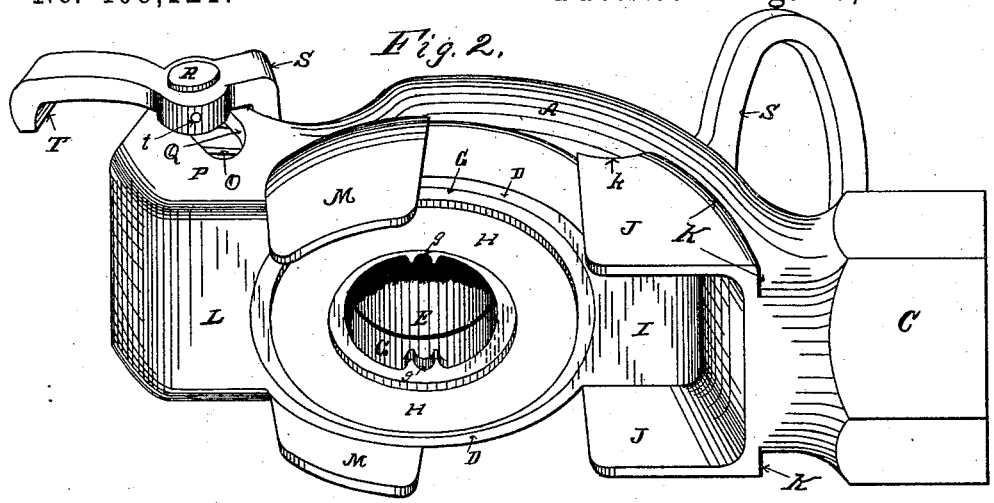
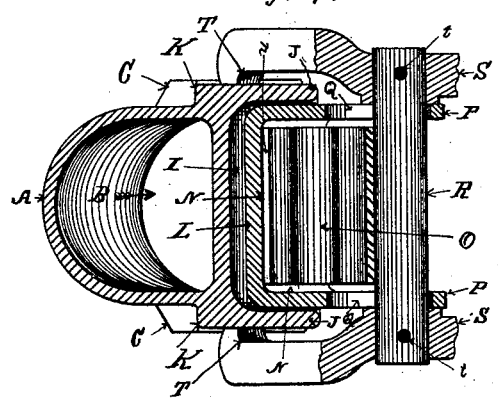
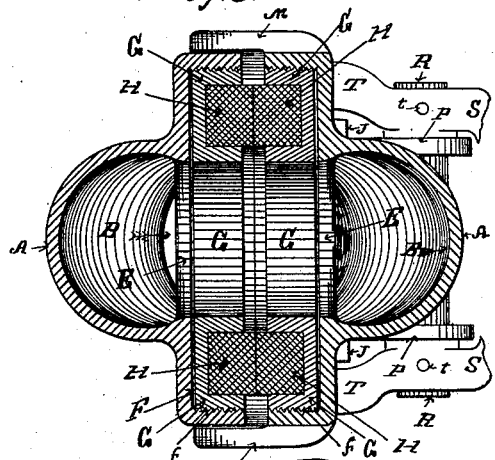
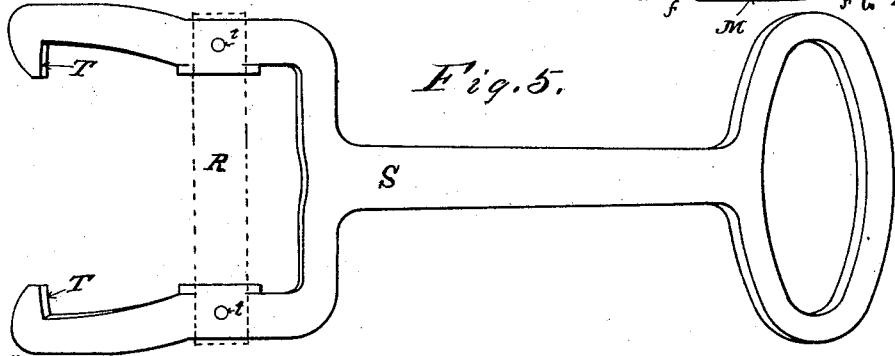
Witnesses
G. J. Mead.
H. M. Stingson
Inventor
John C. Sturgeon

UNITED STATES PATENT OFFICE.

JOHN C. STURGEON, OF ERIE, PENNSYLVANIA, ASSIGNOR OF ONE-FOURTH TO SAMUEL A. DAVENPORT, OF SAME PLACE.

PIPE-COUPLING.

SPECIFICATION forming part of Letters Patent No. 409,121, dated August 13, 1889.

Application filed January 3, 1888. Serial No. 259,741. (No model.)

*To all whom it may concern:*

Be it known that I, JOHN C. STURGEON, a citizen of the United States, residing at Erie, in the county of Erie and State of Pennsylvania, have invented certain new and useful Improvements in Pipe-Couplings; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in pipe-couplings hereinafter set forth and explained, and illustrated in the accompanying drawings, in which—

Figure 1 is a plan view of my improved pipe-coupling, a portion thereof being shown in section. Fig. 2 shows a perspective view of one of the halves or sections of my improved pipe-coupling. Fig. 3 shows a vertical central cross-section of the coupling on the line $x\ x$ in Fig. 1, looking in the direction of the arrow. Fig. 4 shows a vertical cross-section of the coupling on the line $y\ y$ in Fig. 1, looking in the direction of the arrow. Fig. 5 shows one of the locking-levers of my improved coupling detached therefrom.

Like letters refer to like parts in all the figures.

The objects of my invention are, first, to construct a pipe-coupling the halves or sections of which are duplicates of each other and adapted to form a longitudinal joint with each other, each section being provided with cam-surfaces and with locking-levers adapted to operate on said cam-surfaces to secure the sections together; second, to provide a pipe-coupling consisting of duplicate halves or sections having longitudinal coupling-faces adapted to be placed together and separated on a line directly at right angles with said longitudinal coupling-faces, with a projection or projections extending longitudinally or radially from the periphery of the coupling-face, and slots or pockets extending longitudinally or radially from the opposite side of the periphery of the coupling-face, and adapted to receive the projection or projections on the opposite half of the coupling when they are brought together, so as to brace and stiffen the joint formed between the two halves of the coupling when clamped together; third, to construct a pipe-coupling consisting of duplicate halves or sections having lateral exit-openings and longitudinal coupling-faces around said openings adapted to form a joint between them, with flanges or lugs projecting laterally from the peripheries of the coupling-faces, and adapted to so engage with the peripheries or flanges or lugs on the opposite coupling-faces as to prevent the halves of the coupling from being drawn apart longitudinally or the coupling-faces moved longitudinally upon each other; fourth, to construct such pipe-coupling with cam and lever locking mechanism having springs operating on the locking-levers, so as to provide for the expansion and contraction of the parts of the coupling, and also to produce an elastic pressure on the packing when the parts are coupled together.

Other objects and features of my invention are hereinafter set forth and explained in the specification and claims.

In the construction of my invention shown in the drawings I make the sections A of the coupling alike, so that they are duplicates of each other, and with longitudinal passages B, one end of this passage B ending in a screw-threaded collar C, by means whereof the sections A may be secured to pipes. (Not shown.) Near its inner end the passage B curves laterally, forming the opening E in the coupling-face D, making a continuous passage through the halves or sections A of the coupling. Around the passage E, I make an annular chamber F, adapted to receive and retain a packing-shell G, in which packing H is secured, so that when the shell G is in place the face of the packing H projects somewhat beyond the coupling-face D. The packing-shell G is preferably screw-threaded on its periphery, and fits into a screw-thread $f$ in the chamber F, and is provided with lugs $g$ on its inner surface, so that when desired it can be easily removed. I can, however, entirely dispense with the packing-shell G, if desired, and secure the packing H directly in the chamber F, the shell G not being essential in the securing of the packing therein.

At one side of the packing H, preferably toward the collar C, the coupling-face D is extended so that the sides J J form a pocket or slot I, and on the outside of the sides J J thereof I make cam-shaped surfaces K k, for the purpose hereinafter set forth.

At the side of the packing H opposite the pocket or slot I, I extend the coupling-face D longitudinally, so as to form a projection L, adapted to enter and fit the pocket or slot I in a duplicate half or section A of the coupling, so that when the halves or sections of the coupling are placed together the projections L enter the pockets or slots I in each of the halves or sections of the coupling, so as to vertically brace and stiffen the joint. The halves or sections A also have flanges or lugs M projecting laterally beyond the coupling-face D, so that when the two halves or sections A are brought together the flanges or lugs M on each section engage with each other or with the peripheries of the coupling-faces of the corresponding half or section, so as to prevent the halves of the coupling from being pulled apart longitudinally, or any lateral movement of the packing-faces upon each other.

In the back of the projection L, I preferably make a recess N, adapted to receive a spring O. The sides P of this recess N extend upward some distance, and are provided with inclined slots Q, in which the axis R of the locking-lever S, Fig. 5, operates. In the recess N under the axis R of the locking-lever S, I place a spring Q, one end n of this spring resting on the bottom of the recess N, and the other end n' thereof preferably extending back some distance, where it operates in vertical slides p, sliding freely up and down thereon. This form and arrangement of spring can be varied, and any other form and arrangement of spring can be used, if desired.

When the two sections of the coupling are brought together, the locking-levers S are in the position shown in the sectional view of Fig. 1. The lever S being then moved in the direction shown by the arrow, the hooks T of the locking-lever S engage with the cam-surfaces K in the corresponding section of the coupling, and as the hooks T travel up the surfaces of the cams K the spring O is compressed by the axis R of the locking-lever S traveling down the inclined slots Q until the hooks T enter the small depression k at the ends of the cam-surfaces K, the sections of the coupling being then securely locked together, the spring O operating to take up all slack and to prevent the hooks T from moving on the cams K and unlocking, and also providing for the expansion and contraction of the parts of the coupling, so that the faces of the packing-rings H are at all times held in close contact with each other, so that the joint formed between them is at all times tight.

It is obvious from the description hereinbefore given that the halves or sections of this coupling are both alike—neither male nor female—so that any two of them brought together makes a complete coupling, and also that the parts of the coupling, when brought together and locked, so overlap each other longitudinally at each side of the packing that the joint is effectually braced against any vertical movement whatever, while the springs O exert a strong pressure laterally upon the ends of the halves or sections of the coupling, so that the joint formed thereby is substantially as rigid as the pipes coupled together therewith.

I have thus fully described such a construction of my invention as will enable others skilled in the art to which it appertains to construct and use the same. It is obvious, however, that the construction of my invention shown and described may be readily modified both in shape and in the arrangement of the parts thereof within the scope of my invention. Therefore I do not limit my invention to the particular form of coupling shown; but

What I claim as new, and desire to secure by Letters Patent of the United States, is—

1. A pipe-coupling composed of duplicate halves or sections, each half consisting of a shell adapted to be secured to a pipe or hose and having a longitudinal coupling-face and a lateral passage opening therein, annular packing around said opening, and flanges projecting laterally from the periphery of the outer end or half of the coupling-face adapted to engage with flanges or lugs on a duplicate half or section of the coupling, and lever and cam mechanism for securing the halves or sections of the coupling together, substantially as and for the purpose set forth.

2. A pipe-coupling composed of duplicate halves or sections, each half consisting of a shell adapted to be secured to a pipe or hose, a longitudinal coupling-face having a lateral opening therein and annular packing around said opening, a pocket or slot at one side of the coupling-face, and a projection at the opposite side thereof, adapted to enter a pocket or slot in a duplicate half or section of the coupling, and lever mechanism on each half or section adapted to engage with cam-surfaces on duplicate halves or sections for securing the coupling together, substantially as and for the purpose set forth.

3. The combination, in each half or section of a pipe-coupling composed of duplicate halves or sections having a passage opening laterally through a longitudinal coupling-face on one side of the half or section and annular packing in said face around said opening, of a pocket or slot having cam-faces on the outer sides thereof at one side of the coupling-face, and a projection at the opposite side of said coupling-face, adapted to enter a pocket or slot in a duplicate half or section of the coupling, with a locking-lever having hooks thereon adapted to engage with the cam-surfaces on a duplicate half of the coupling, and a spring under the axis of said locking-lever, substantially as and for the purpose set forth.

4. The combination, in each half or section of a pipe-coupling composed of duplicate halves or sections having a passage opening laterally through a longitudinal coupling-face, of a projection at one side of said opening, with a locking-lever mounted in slotted ears at the sides of said projection and adapted to engage with cam-surfaces on a duplicate half or section of the coupling, and a spring secured to the back of said projection under the axis of said locking-lever, substantially as and for the purpose set forth.

5. The combination, in each half or section of a pipe-coupling composed of duplicate halves or sections, of a shell having a passage opening laterally through a longitudinal coupling-face and annular packing around said opening, with laterally-projecting flanges or lugs adapted to engage with the periphery of the coupling-face on a duplicate half or section of the coupling, so as to prevent the halves of the coupling from being drawn apart longitudinally, substantially as and for the purpose set forth.

6. The combination, in each half or section of a pipe-coupling composed of duplicate halves or sections, of a shell having longitudinal coupling-faces, a passage opening laterally through said coupling-face, and annular packing in said coupling-face around said opening, with flanges forming a slot or pocket at one side of the coupling-face and a projection at its opposite side adapted to enter a like pocket or slot in a duplicate half or section of the coupling, and flanges or lugs extending laterally from the sides of the coupling-face, substantially as and for the purpose set forth.

7. The combination, in each half or section of a pipe-coupling composed of duplicate halves or sections, each having a passage adapted at one end to be secured to a pipe and at the other opening laterally through a longitudinal coupling-face, of cam-surfaces at one side of said coupling-face, with a locking-lever at the opposite side of the coupling-face adapted to engage with the cam-surfaces on a duplicate half or section of the coupling for securing the two halves of the coupling together, substantially as and for the purpose set forth.

8. The combination, in each half or section of a pipe-coupling composed of duplicate halves or sections, of a longitudinal coupling-face D, a passage B, having a lateral opening E in said coupling-face, and annular packing H in the coupling-face around the opening E, with laterally-projecting flanges or lugs M on the periphery of the outer end or half of the coupling-face D, adapted to engage with flanges or lugs on a duplicate half or section of the coupling, substantially as and for the purpose set forth.

9. The combination, in each half or section of a pipe-coupling consisting of duplicate halves or sections having longitudinal coupling-faces adapted to be placed together and separated on a line at right angles to the coupling-faces thereof, of a shell A, having a longitudinal coupling-face D, a passage B, a lateral opening E through said coupling-face, and annular packing H in the coupling-face around the opening E, with a slot or pocket I at one side of the coupling-face D and a projection L at its opposite side, and flanges M M, projecting laterally from the periphery of the outer end or half of the coupling-face D, substantially as and for the purpose set forth.

10. The combination, in each half or section of a pipe-coupling composed of duplicate halves or sections, of a shell A, having a collar C at one end thereof, and a passage B, having a lateral opening E through the coupling-face D, and an annular packing-shell G, containing packing H, surrounding the opening E, with the pocket or slot I, having cam-surfaces K k thereon at one side of the coupling-face, and the projection L, having the locking-lever S T mounted thereon at the opposite side of the coupling-face, substantially as and for the purpose set forth.

11. The combination, in a half or section of a pipe-coupling composed of duplicate halves or sections, of the longitudinal coupling-face D and the lateral passage-opening E therein, the pocket or slot I, the projecting end L, and the laterally-projecting flanges or lugs M, with the locking-lever S and spring O, for securing duplicate halves or sections together, substantially as and for the purpose set forth.

12. The combination, in a half or section of a pipe-coupling composed of duplicate halves or sections, of the longitudinal coupling-face D, having the lateral passage-opening E and the annular packing H therein, the pocket or slot I, having the cam-surfaces K thereon, the projection L, adapted to enter the pocket or slot I in a duplicate half or section of a coupling, and the lateral flanges or lugs M, with the locking-lever S, mounted in the slots Q and adapted to engage with the cams K, and a spring O under the axis of said locking-lever, substantially as and for the purpose set forth.

13. The combination, in a half or section of a pipe-coupling composed of duplicate halves or sections, of a longitudinal coupling-face having cam-surfaces K at one side thereof, with a spring O and locking-lever S on the opposite side resting upon said spring, and adapted to engage with like cam-surfaces K on a duplicate half or section for securing the sections of the coupling together, substantially as and for the purpose set forth.

In testimony whereof I affix my signature in presence of two witnesses.

JOHN C. STURGEON.

Witnesses:
CHAS. KRANCH,
CLARK OLDS.